(12) United States Patent
Arakawa

(10) Patent No.: US 6,188,190 B1
(45) Date of Patent: *Feb. 13, 2001

(54) MULTI-AXIS MOTOR CONTROLLER

(75) Inventor: Nobuo Arakawa, Tokyo (JP)

(73) Assignee: Sanyo Denki Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/115,794

(22) Filed: Jul. 15, 1998

(30) Foreign Application Priority Data

Apr. 16, 1998 (JP) .................................................. 10-121624

(51) Int. Cl.$^7$ ................................................. G05B 11/01
(52) U.S. Cl. ..................... 318/560; 318/568.21; 318/625
(58) Field of Search ................................. 318/560–579, 318/590–625; 901/2, 6–9, 19, 23, 24; 395/80, 82, 83, 84, 95, 96; 364/131, 132, 140.02, 140.03, 474.28, 474.3; 700/2, 3, 186, 188, 245, 247, 248, 249, 260, 261

(56) References Cited

U.S. PATENT DOCUMENTS

| | | | |
|---|---|---|---|
| 4,578,764 | * | 3/1986 | Hutchins et al. ........................ 395/84 |
| 4,714,400 | * | 12/1987 | Barnett et al. ......................... 414/751 |
| 4,990,839 | * | 2/1991 | Schonlau ................................. 395/83 |
| 5,136,222 | * | 8/1992 | Yamamoto et al. ................. 318/568.2 |
| 5,222,017 | * | 6/1993 | Yellowley et al. .................... 364/132 |
| 5,268,898 | * | 12/1993 | Kazato .................................. 370/447 |
| 5,339,014 | * | 8/1994 | Nesper .................................. 318/563 |
| 5,361,260 | * | 11/1994 | Mito ..................................... 370/452 |
| 5,382,885 | * | 1/1995 | Salcudean et al. ............. 318/568.11 |
| 5,659,480 | * | 8/1997 | Anderson et al. ............... 318/567 X |
| 5,742,143 | * | 4/1998 | Katagiri ................................ 318/625 |

FOREIGN PATENT DOCUMENTS 8-256500  10/1996  (JP) .

* cited by examiner

Primary Examiner—Brian Sircus
(74) Attorney, Agent, or Firm—Pollock, Vande Sande & Amernick

(57) ABSTRACT

A multi-axis motor controller is provided wherein connectors made to common specifications are provided on a multi-drive control unit of a motor drive control section operated by DC power received from a power supply unit, servo amplifier units and an interface unit. The connectors made to common specifications are used to interconnect the units by local bus cables and enable signals to be sent and received by serial transmission as desired among the units. This architecture simplifies the electrical interconnection among the units and lowers cost without sacrificing freedom of unit layout.

12 Claims, 1 Drawing Sheet

MULTI-AXIS MOTOR CONTROLLER

BACKGROUND OF THE INVENTION

1. Field of the Invention

The present invention relates to a multi-axis motor controller used to control the driving of multiple servo motors for enabling multi-axis control in an industrial robot or the like.

2. Background Art

The conventional multi-axis motor controller is equipped with a separate dedicated control unit for the servo motor associated with each axis. Each control unit is provided with numerous connectors for establishing the required electrical interconnections. Numerous cables are also required. The conventional system is therefore expensive owing to the high cost of the large number of required components and the considerable expense of installing the complex wiring.

To cope with this problem, Japanese Public Disclosure No. Hei 8-256500, for example, teaches a configuration in which a group of functional element units are laid out on and fixed to a circuit board provided beforehand with circuit wiring. The attachment of the laid-out functional element units to the circuit board enables functional element unit side connectors to engage with circuit board side connectors through the circuit wiring to establish electrical connection among the functional element units. This architecture reduces the number of connectors by simplifying the wiring layout and improving the connector arrangement. Moreover, the interconnection of the functional element units through the connectors results in a more rational wiring layout that enables a reduction in the number of wires. This also simplifies the wiring. In addition, the architecture enhances the reliability of control operations by eliminating wiring mistakes and helps to prevent external noise from getting into the wiring.

This conventional technology achieves its advantages by grouping the units, engaging the units with the circuit board through connectors, and utilizing wiring provided on the circuit board beforehand to establish the required electrical interconnections. At the same time, however, the architecture offers no flexibility in laying out the units in the control panel. This makes it impossible to optimize control panel space utilization.

In addition, the fact that the cables interconnecting the units are of different special types complicates the wiring and also reduces the number of identical connectors, cables and other components. This increases the number of component types and raises the unit cost of the components.

The invention will be better understood and other objects and advantages thereof will be more apparent from the following detailed description of preferred embodiments with reference to the accompanying drawings.

SUMMARY OF THE INVENTION

Figure 1:
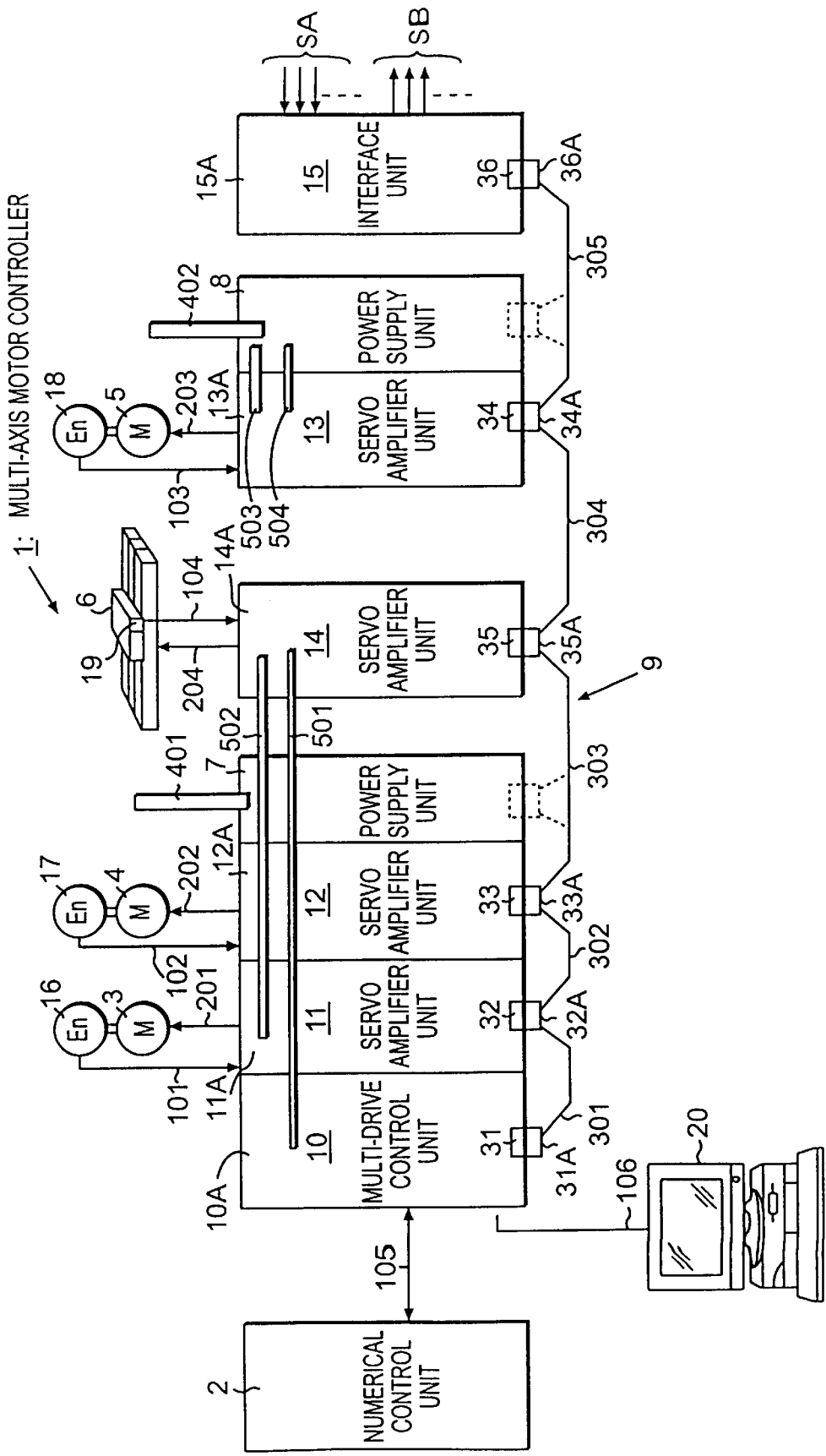
FIG. 1 is a block diagram of a multi-axis motor controller that is an embodiment of the invention.

An object of this invention is therefore to provide a multi-axis motor controller that overcomes the aforesaid shortcomings of the prior art.

Another object of the invention is to provide a multi-axis motor controller that has a simple wiring system and affords great freedom in unit layout.

Another object of the invention is to provide a multi-axis motor controller whose cost is lowered by reducing the number of component types used for electrical interconnection.

For achieving these objects, the invention provides a multi-axis motor controller including at least one power supply section that once converts AC power supplied from an AC power source to DC power and a motor drive control section that is equipped with multiple units each performing a different control function and housed in a separate case and converts the DC power to AC control power for controlling driving of motors associated with different axes, the multi-axis motor controller comprising generic connectors provided on the units of the motor drive control section and local bus cables electrically interconnecting the units through the generic connectors to enable sending and receiving of required signals among the units through the local bus cables. The transmission of a signal from any unit to another unit is effected via local bus cables that electrically interconnect the units through generic connectors, i.e., connectors made to common specifications, provided on the individual units. Owing to this configuration, the electrical interconnection among the units is simple and the degree of freedom in laying out the units high.

The motor drive control section can have a multi-drive control unit that performs processing based on commands from a host controller to effect control including position loop control and speed loop control for all axes and multiple servo amplifier units provided one in association with each motor associated with an axis that perform current loop processing and processing involving motor driving based on current commands from the multi-drive control unit, signals sent and received between the multi-drive control unit and the servo amplifier units being sent and received through the local bus cables. Various command signals from the host controller are sent to the subordinate units and the like through the local bus cables, and signals from the subordinate units are sent to the host controller also through the local bus cables. The sending and receiving of signals between the multi-drive control unit and the servo amplifier units is similarly conducted.

The motor drive control section can have an interface unit that handles input and output of signals for all axes with respect to the exterior, signals sent and received between the multi-drive control unit and the interface unit being sent and received through the local bus cables. In this case, signals input to the interface unit from the exterior, e.g., servo ON signals, torque limit signals, alarm reset signals, analog signals, photoelectric switch signals, valve signals and temperature sensor signals, are sent to the servo amplifier units through the local bus cables. Further, signals from the servo amplifier units are sent to the interface unit through the local bus cables, and the interface unit outputs alarm signals, low-speed signals, interface signals, analog signals and the like to the exterior.

DETAILED DESCRIPTION OF THE PREFERRED EMBODIMENT

FIG. 1 is a block diagram of a multi-axis motor controller that is an embodiment of the invention.

The multi-axis motor controller 1 shown in FIG. 1 is a four-axis controller configured to control servo motors 3, 4 and 5 and a linear motor 6 in response to commands from a numerical control unit 2. It is equipped with power supply units 7 and 8, and a motor drive control section 9 for controlling the driving of the servo motors 3, 4 and 5 and the linear motor 6.

As explained further later, the motor drive control section 9 is supplied with DC power by the power supply units 7 and 8. It converts this DC power to AC control power that it uses to control the driving of the servo motors 3, 4 and 5 and the linear motor 6. The unit providing each control function in the motor drive control section 9 is housed in a separate case. The motor drive control section 9 includes a multi-drive control unit 10, servo amplifier units 11–14 respectively associated with the servo motors 3, 4 and 5 and the linear motor 6, and an interface unit 15. These units are electrically interconnected, as explained below.

The servo amplifier units 11–14 are connected to the servo motors 3, 4 and 5 and the linear motor 6 by motor power cables 201–204. Encoders 16–19 provided in association one with each of the servo motors 3, 4 and 5 and the linear motor 6 produce position feedback signals that are input to the servo amplifier units 11–14 through encoder signal cables 101–104.

The multi-drive control unit 10 is connected to the numerical control unit 2 by a command cable 105 and to a monitor device 20 by a monitor cable 106. The command cable 105 enables position command signals to be sent from the numerical control unit 2 to the multi-drive control unit 10 and status signals to be sent from the multi-drive control unit 10 to the numerical control unit 2.

The multi-drive control unit 10, servo amplifier units 11–14, and interface unit 15, which constitute the essential elements of the motor drive control section 9, are provided on their cases 10A, 11A, 12A, 13A, 14A and 15A by appropriate conventional means with generic connectors 31–36. By "generic connectors" is meant connectors made to the same specifications. The generic connectors 31–36 are interconnected by local bus cables 301–305 for transmission of serial signals. Specifically, the local bus cables 301–305 are provided with connectors 31A–36A that disengageably mate with the generic connectors 31–36 so as to make electrical connection with the corresponding units. Coupling of the connectors 31A–36A and the generic connectors 31–36 completes the configuration of the motor drive control section 9.

The power supply unit 7 is supplied through a power cable 401 with three-phase 200V power from a commercial power line, which it once converts to DC power. DC power from a main power section of the power supply unit 7 (not shown) is supplied to the servo amplifier units 11, 12 and 14 through a main power bus cable 502, while DC power from a control power section of the power supply unit 7 (not shown) is supplied to the multi-drive control unit 10 and the servo amplifier units 11, 12, and 14 through a control power bus cable 501. The power supply unit 8 is supplied through a power cable 402 with three-phase 200V power from a commercial power line, which it once converts to DC power. DC power from a main power section of the power supply unit 8 (not shown) is supplied to the servo amplifier unit 13 through a main power bus cable 503, while DC power from a control power section of the power supply unit 8 (not shown) is supplied to the servo amplifier unit 13 through a control power bus cable 504. It should be noted, however, that this embodiment is not limited to the aforesaid supply of three-phase 200V power through the power cables 401 and 402. Instead, the power supplied can, for example, be of a higher voltage such as 400V. Moreover, it is possible to adopt intelligent power supplies as the power supply units 7 and 8. Since this enables cables similar to the local bus cables 301–305 to be used for sending and receiving alarm signals, sequencing signals and other information among the units, including the power supply units 7 and 8, it is effective for implementing sequence control also encompassing the power supply units 7 and 8. The local bus cable connections in this case are shown in broken lines in FIG. 1.

In the multi-axis motor controller 1 configured in the foregoing manner, the numerical control unit 2 is input with the numerical data required for enabling the servo motors 3, 4 and 5 and the linear motor 6 to effect position and contour control and outputs position command signals for the individual axes to the multi-drive control unit 10 through the command cable 105. The numerical control unit 2 can be of conventional configuration.

In addition to receiving the position command signals from the numerical control unit 2, the multi-drive control unit 10 of the motor drive control section 9 also receives the position feedback signals produced by the encoders 16–19. These position feedback signals are first sent to the associated servo amplifier units and then forwarded to the multi-drive control unit 10 through the local bus cables 301–304 in serial mode. Based on the received signals, the multi-drive control unit 10 conducts processing for position loop control and speed loop control and outputs current commands to the servo amplifier units 11–14. These current commands are sent through the local bus cables 301–304 to the servo amplifier units 11–14 in serial mode. In this way, the motor drive control section 9 converts the DC power supplied from the power supply units 7 and 8 to AC control power used to control the driving of the motors associated with the individual axes, namely, the servo motors 3, 4 and 5 and the linear motor 6.

The function of the interface unit 15 is to effect signal input/output with respect to a host control system including the numerical control unit 2. The interface unit 15 is input from the exterior with interface input signals SA as well as analog signals (not shown) including, for example, a temperature sensor signal. The interface input signals SA include, for instance, servo ON signals, torque limit signals, alarm reset signals, photoelectric switch signals and valve signals. These interface input signals SA are forwarded in serial mode through the local bus cables 301–305 to the multi-drive control unit 10, where they are used for various types of sequence control.

The interface unit 15 performs the function of outputting interface output signals SB and analog signals (not shown) required to be sent from the multi-axis motor controller 1 to the exterior. These interface output signals SB, which include alarm signals, low-speed signals, operation ready signals and the like, are output based on signals received by the interface unit 15 from the multi-drive control unit 10 and the servo amplifier units 11–14 through the local bus cables 301–305.

The multi-drive control unit 10 further receives various parameter setting signals from the monitor device 20 and sends the monitor device 20 signals for monitoring the control. This enables the operator to monitor the control effected by the multi-axis motor controller 1 at the monitor device 20.

As explained in the foregoing, the units constituting the motor drive control section 9, i.e., the multi-drive control unit 10, the servo amplifier units 11–14 and the interface unit 15, are interconnected by the serial transmission type local bus cables 301–305 utilizing the generic connectors 31–36 provided on the individual cases. Signals can therefore be sent and received between desired units by serial transmission using the local bus cables 301–305. In other words, the multi-drive control unit 10 can send current commands for controlling the individual axes to each of the servo amplifier units 11–14. Conversely, each of the servo amplifier units 11–14 can send position feedback signals and current feedback signals to the multi-drive control unit 10. In addition, the multi-drive control unit 10 and the interface unit 15 can send and receive the interface input signals SA and the interface output signals SB.

The sending and receiving of signals between desired units is thus performed by serial transmission using the local bus cables 301–305, which can be connected and disconnected as desired using the generic connectors 31–36. The electrical interconnection among the units is therefore simpler than in the conventional multi-axis motor controller since it is achieved without using large numbers of connectors and wires. Further, since no wiring provided beforehand on a circuit board is required, the layout of the units can be freely altered. This makes it easy to realize, for example, a configuration in which the multi-drive control unit 10 is located near the numerical control unit 2, because this only requires the local bus cable 301 and the control power bus cable 502 to be made long. Moreover, a configuration in which the interface unit 15 is located outside the control panel can be realized merely by elongating the local bus cable 305.

This has the merit of enabling effective utilization of the space inside the control panel.

Further, the electrical interconnection among the units is simple and can be provided merely by coupling the connectors 31A–36A of the local bus cables 301–305 with the generic connectors 31–36. The electrical interconnection can therefore be achieved without risk of wiring errors at a markedly low cost that contributes to reducing the overall cost of the multi-axis motor controller.

In addition, the use of interchangeable components, as seen in adoption of the generic connectors 31–36 and the identically configured local bus cables 301–305, minimizes the number of component types to contribute further to cost reduction.

What is claimed is:

1. A multi-axis motor controller including at least one power supply section that converts AC power supplied form an exterior source to DC power, and a motor drive control section connected to a host controller, said motor drive control section being equipped with multiple units each performing a different control function and housed in a separate case and converts the DC power to AC control power for controlling driving of motors associated with different axes, the multi-axis motor controller comprising generic connectors provided on the units of the motor drive control section and identically configured local bus cables electrically interconnecting the units through the generic connectors to enable sending and receiving of required signals among the units through the local bus cables, said generic connectors and identically configured local bus cables providing for interchangeability between said multiple units.

2. A multi-axis motor controller as claimed in claim 1, wherein the motor drive control section comprises a multi-drive control unit that performs processing based on commands from said host controller to effect control including position loop control and speed loop control for all axes and multiple servo amplifier units provided one in association with each motor associated with an axis that perform current loop processing and processing involving motor driving based on current commands from the multi-drive control unit, signals sent and received between the multi-drive control unit and the servo amplifier units being sent and received through the local bus cables.

3. A multi-axis motor controller as claimed in claim 2, wherein the motor drive control section comprises an interface unit that handles input and output of signals for all axes with respect to the exterior, signals sent and received between the multi-drive control unit and the interface unit being sent and received through the local bus cables.

4. A multi-axis motor controller as claimed in claim 3, wherein the interface unit is provided with at least one generic connector made to the same specifications as the generic connectors provided on the units of the motor drive control section, the interface unit being connected to the local bus cable through the generic connector.

5. A multi-axis motor controller as claimed in claim 2, wherein the host controller is a numerical control unit.

6. A multi-axis motor controller as claimed in claim 1, wherein the power supply section is also provided with a generic connector and the power supply section is electrically connected to a local bus cable through the generic connector to enable sending and receiving of required signals between the power supply section and the multiple units through the local bus cables.

7. A multi-axis motor controller as claimed in claim 4, wherein the power supply section is also provided with a generic connector and the power supply section is electrically connected to a local bus cable through the generic connector to enable sending and receiving of required signals between the power supply section and the multiple units through the local bus cables.

8. A multi-axis motor controller as claimed in claim 7, wherein the host controller is a numerical control unit.

9. A multi-axis controller as claimed in claim 7, wherein the generic connectors disengageably mate with connectors provided on the local bus cables.

10. A multi-axis controller as claimed in claim 1, wherein the generic connectors disengageably mate with connectors provided on the local bus cables.

11. A multi-axis controller as claimed in claim 4, wherein the generic connectors disengageably mate with connectors provided on the local bus cables.

12. A multi-axis controller as claimed in claim 6, wherein the generic connectors disengageably mate with connectors provided on the local bus cables.

* * * * *